United States Patent
Paul

[11] 3,893,346
[45] July 8, 1975

[54] ARTICULATELY MOUNTED FLUID CONTROLS

[75] Inventor: David S. Paul, Mississauga, Canada

[73] Assignee: Massey-Ferguson Inc., Detroit, Mich.

[22] Filed: Jan. 4, 1974

[21] Appl. No.: 430,831

[52] U.S. Cl.......... 74/471 R; 74/471 XY; 74/491; 74/531
[51] Int. Cl............................. G05g 9/04
[58] Field of Search.......... 74/471 R, 471 XY, 491, 74/531

[56] References Cited
UNITED STATES PATENTS

| | | |
|---|---|---|
| 2,605,008 | 7/1952 | Schroeder.................. 74/491 X |
| 3,496,796 | 2/1970 | Alpers et al................ 137/636.2 X |
| 3,504,569 | 4/1970 | Zoltok........................ 74/531 |
| 3,744,335 | 7/1973 | Karlsson et al............. 74/471 XY |
| 3,766,944 | 10/1973 | Distler...................... 137/636.2 X |
| 3,791,474 | 2/1974 | Stammen................... 74/491 X |

FOREIGN PATENTS OR APPLICATIONS
860,831   2/1961   United Kingdom........... 74/471 XY Primary Examiner—Allan D. Herrmann
Attorney, Agent, or Firm—Thomas P. Lewandowski

[57] ABSTRACT

A control valve is mounted on a pivotal lever having hand grip controls mounted on the end of the lever opposite the valve whereby the hand grip can operate the valve which in turn moves with the lever to permit positioning of the hand grip over a range of lever positions.

10 Claims, 7 Drawing Figures

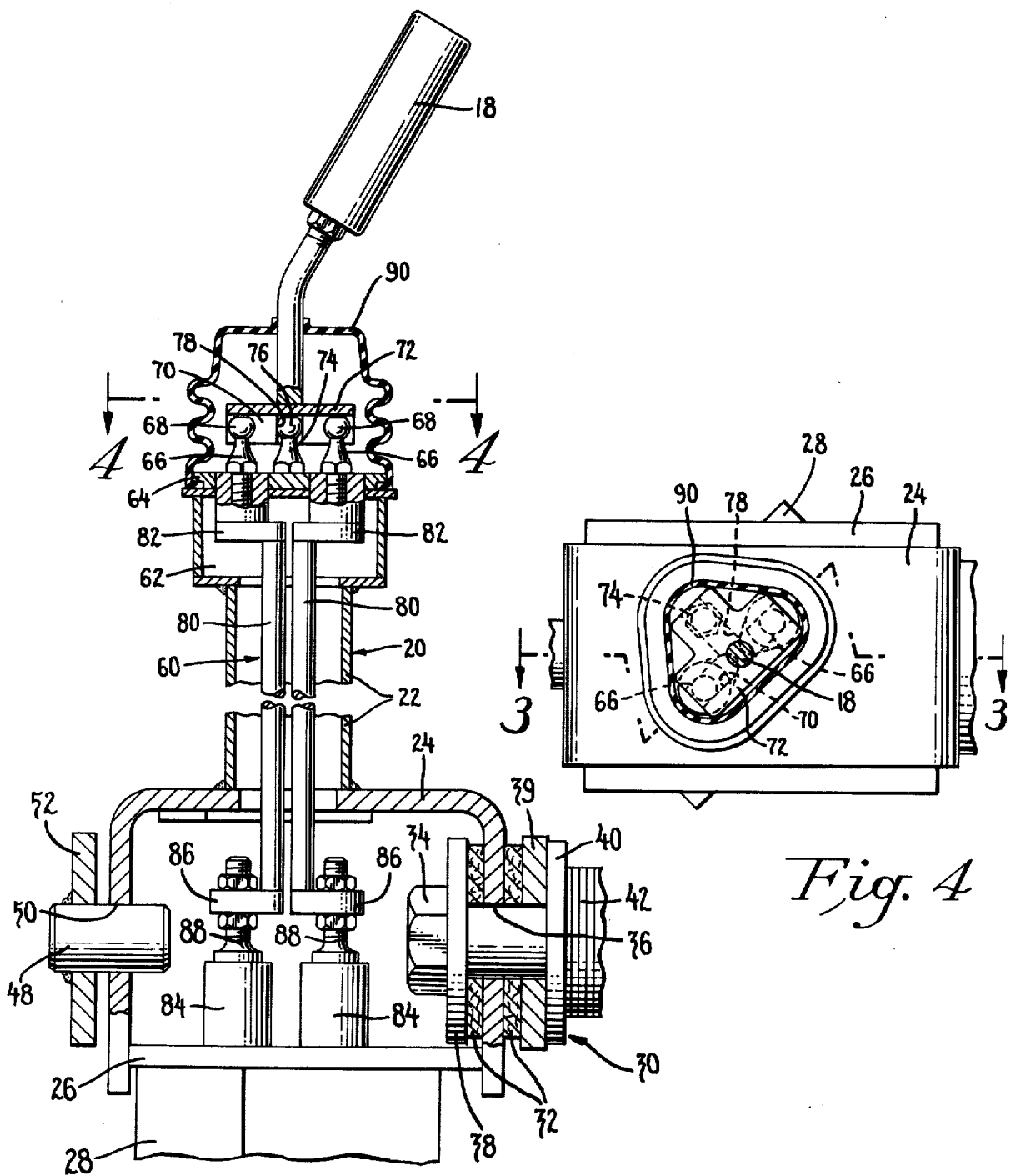

ARTICULATELY MOUNTED FLUID CONTROLS

Heretofore numerous control levers having hand grip controls have been known, an example of which is illustrated in U.S. Pat. No. 3,220,280 issued to J. C. Schmetrz on Nov. 30, 1965. The handle and lever therein combine in movement to give four usable outputs for the control. A quick review of FIG. 4 of the above patent will, however, indicate that complex mechanism and linkage are required to achieve the desired motions for control elements when the motions must be accomplished mechanically.

The present control achieves multiple usable outputs in a design, which is much simpler than the above mechanical design, using a control valve mounted on a lever supporting the hand grip.

Hydraulic controls have been mounted on levers as illustrated in British Patent No. 997,786 wherein FIG. 2 shows two positions for controls mounted on a movable lever 6, but the valving is located with the controls, and flexible conduits are required to connect the control unit 9 with the trailing implement to enable the control unit 9 to alternately be positioned, as indicated in phantom in FIG. 2, adjacent the implement. The same concept of using flexible conduits to enable hydraulic actuators to be mounted on movable supports is illustrated in the use of foot pedals 24, 25 and 26 which move with the seat of the vehicle in FIG. 1 of U.S. Pat. No. 3,039,553 issued to C. Van Der Lely et al. on June 19, 1962.

Where the flexible conduit design is used, the controls must include all the valves for each motion desired at the location of the operator's hand grip. In the present design a mechanical connection between the hand grip and a valve located at the opposite end of the lever places the sound of the valve at a more remote location from the operator making operation more comfortable. Further, the movement of the valve compared to that of the hand grip is minimal thereby reducing the requirements for the flexible conduits connected to the valve and divorcing the conduits from contact with the hand grip.

In U.S. Pat. No. 3,362,247 issued to W. A. Watts on Jan. 9, 1968, FIGS. 2 and 3 illustrate alternate positions for a hydraulic valve 60 having a steering wheel 70 mounted on the valve 60 whenever the intermediate portion 37 of the steering column 30 is rotated in end portion 32. Again, the valve is not located separate from the actuator, in this case the steering wheel 70, and flexible conduit must be attached to the operator's controls.

The present invention contemplates the isolation of the valve from the operator for quieter operation and may further include the use of a pilot or servo valve to make the required force to operate the hand grip smaller and further reduce the noise level by permitting isolation of the operator from the heavier duty control valves which can then be mounted on the portion of the machine being actuated.

The present control relates to pressure fluid controls and more particularly to pivotally mounted levers having means for actuating a control valve mounted on the end of the lever opposite the control valve which is also mounted on the lever. Conduit means, such as hydraulic flexible hose, interconnects the control valve with the components controlled. It is particularly advantageous to have a servo valve for the control valve to permit the heavy duty control valve to be located remote of the control and its operator. Isolation of the heavy duty control valve from the operator reduces the noise level to which he is subjected.

It is also advantageous from the standpoint of noise to have the servo valve remote from the operator which can be accomplished by positioning the valve at the end of the lever opposite the actuating means which may be a manual hand grip. The hand grip is placed opposite the pivot of the lever to give it the longest moment arm and most movement while the servo valve is positioned adjacent the pivot point to minimize its movement and reduce the requirement on the amount of flexible hose needed as well as hose fatigue. A mechanical linkage in the form of a rod assembly, in the embodiment illustrated, interconnects the hand grip with the control valve.

The control may further be provided with means for retaining the lever in a multiple number of positions, such as a friction clutch type assembly.

Referring to the drawings:

FIG. 3 is an enlarged view of one of the controls in FIG. 1 with portions cut away, along the line 3—3 of FIG. 4, to illustrate greater detail and with the center portion of the Figure being fragmented;

FIG. 4 is a view taken along line 4—4 of FIG. 3;

Figure 1:
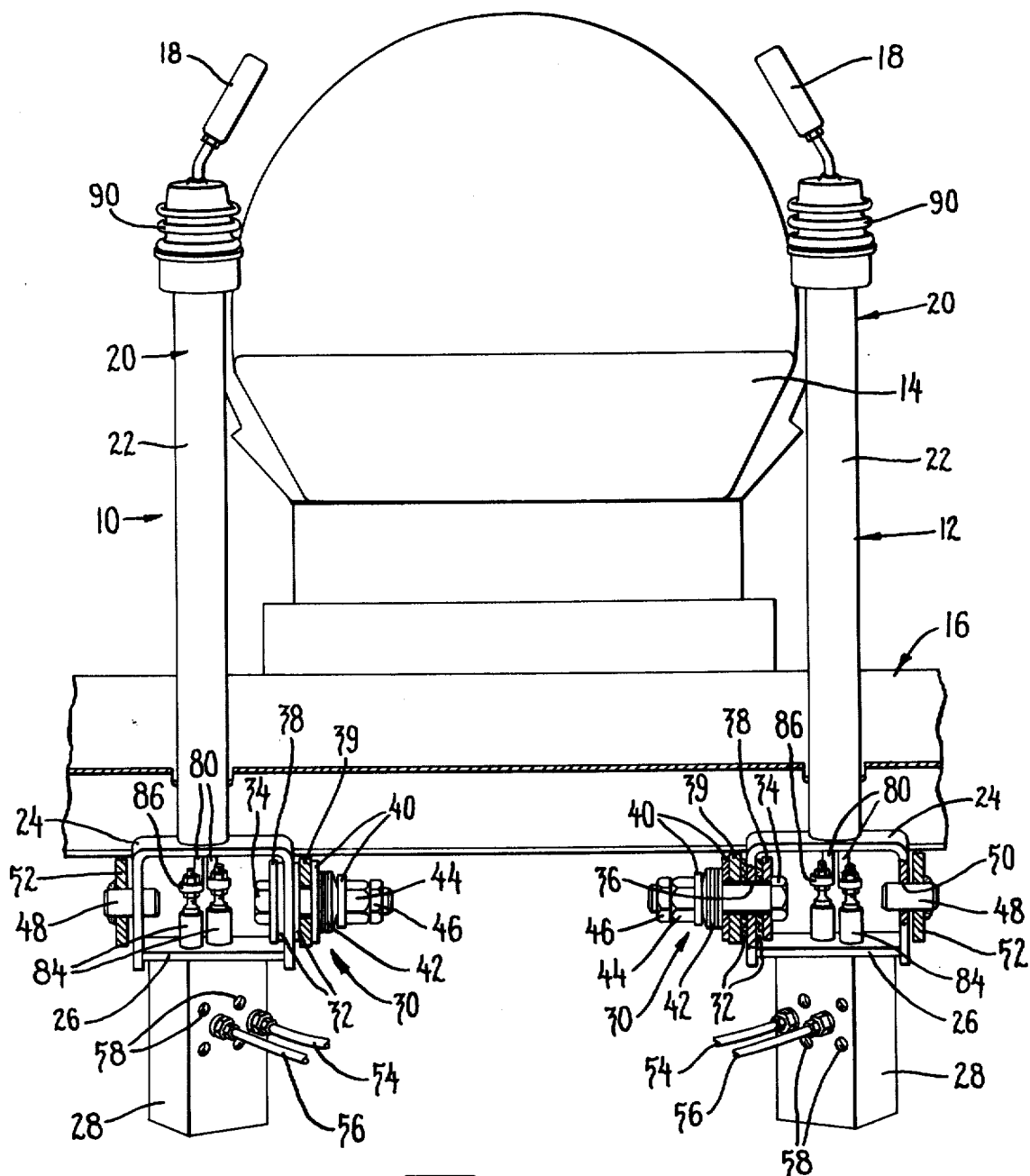
FIG. 1 is an elevational view of an embodiment of the present invention illustrating companion right and left hand controls positioned with respect to an operator's seat and mounted on a vehicle frame.

In FIG. 1 the companion right hand and left hand controls are indicated generally by the reference numerals 10 and 12, respectively. The controls are located on opposite sides of an operator's seat 14 and pivotally mounted to vehicle base structure 16 to permit alternate positioning of the control as illustrated by phantom positions A and B in FIG. 2.

Figure 2:
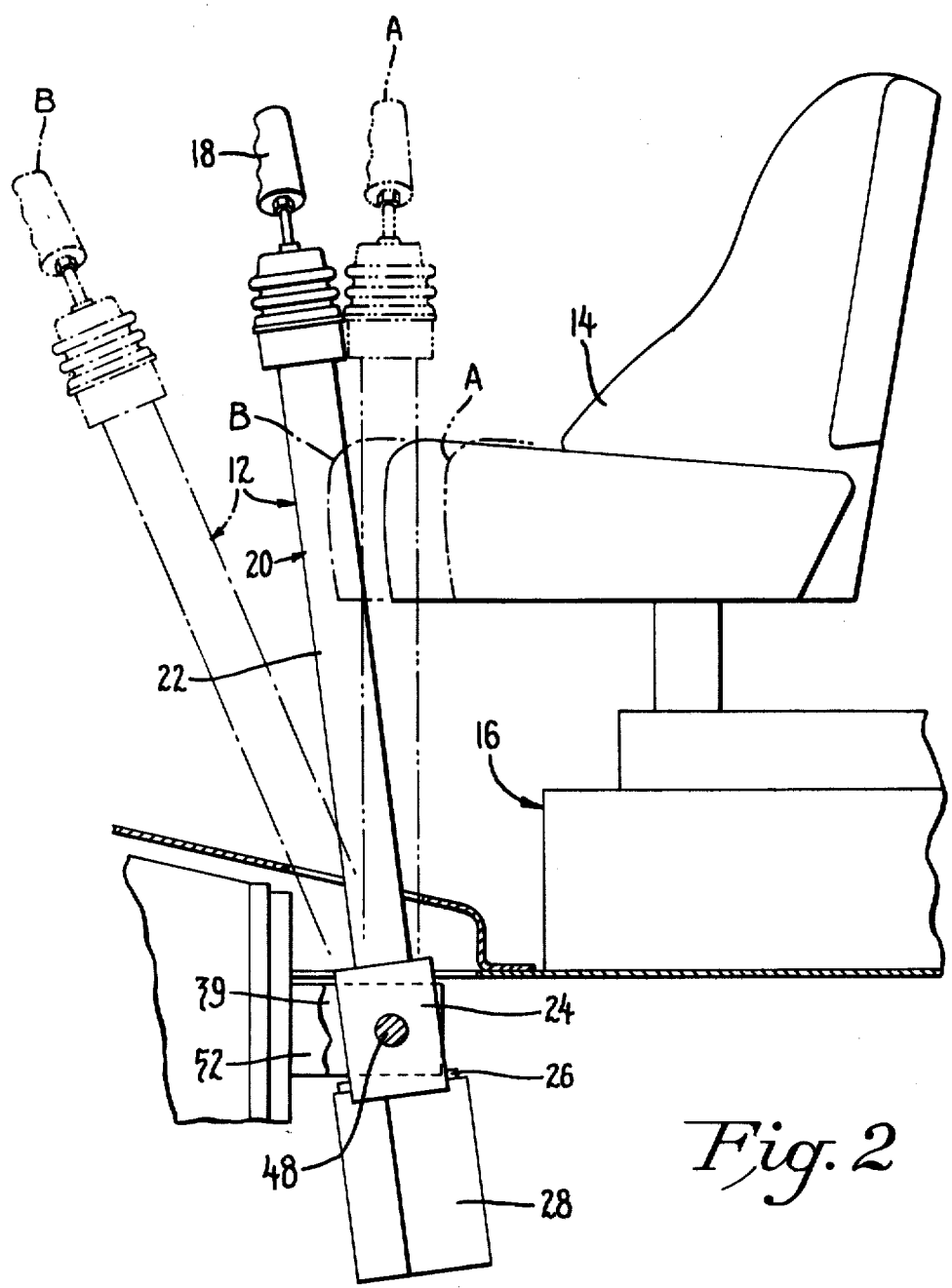
FIG. 2 is a side view of the controls in FIG. 1 illustrating one of the controls in alternate positions by use of phantom lines.

FIG. 2 also illustrates alternate positions A and B for the operator's seat 14 and it becomes clear that the controls, therefore, may be positioned not only for comfort to suite the operator's size but also to suit the position of the operator's seat. Examples of practical applications of these controls to particular vehicles would include the backhoe controls on a tractor digger loader and the controls for an excavator.

Referring to FIGS. 1 and 2 the left hand control 12 will be described in detail, but it is to be understood that the description applies equally as well to the right hand control 10 which is simply an opposite hand duplication of the left hand control 12. The control 12 includes a hand grip 18 movably mounted on a lever 20 having a column 22 and supporting bracket 24. The supporting bracket 24 is of a U-shape to accommodate a mounting plate 26 for receiving a control valve 28. The U-bracket 24 is pivotally mounted to the base structure 16 of the vehicle by a friction clutch type assembly 30.

It is to be understood that the controls could be applied to base structures other than those of vehicles, such as stationary machine controls.

The clutch type assembly 30 maintains the position of the control 12 over an infinite number of positions inbetween those indicated by phantom positions A and B in FIG. 2.

An advantage to having the multiple positions such as shown in phantom positions A and B of FIG. 2 is to allow an operator, for example, of a backhoe to bring his seat full forward to position B whereby he can lean forward to observe depth digging in close to his machine whereas in the alternative when he is digging out away from the machine he may reposition his seat to position A or any intermediate position which is more comfortable for him.

One skilled in the art would be aware of numerous means for retaining the position of the lever 20. An advantage to the particular embodiment illustrated, of the friction clutch type assembly 30, is its ability to maintain the lever in an infinite number of positions as opposed to a predetermined number of fixed positions. Where necessary two friction clutch type assemblies 30 could be provided for one control 12, being located on both sides of the support bracket 24.

An alternative to the friction clutch type assembly 30 would be a ball joint permitting a circular pattern for positioning of the hand grip 18 by introduction of movement of the lever 20 transverse to the linear motion of phantom positions A and B.

The flexibility in the clutch assembly 30 is derived from the use of friction washers 32 of a material having a high coefficient of friction such as a fibrous material. The friction washers are mounted on a bolt 34 passing through an aperture 36 in the support bracket 24. Washer 38 on the outside of one friction washer 32 and element 39 of the base structure 16 supporting control 12 adjacent the other washer 32 maintain the friction washers 32 in flat alignment with the support bracket 24. A pair of wear washers 40 on either side of a disc spring washer 42 provide the proper bias on the friction washers 32 to maintain the position of lever 20. The assembly 30 is held together by hex nut 44 and lock nut 46.

Where only one clutch assembly 30 would be used, the opposite side of the support bracket could be provided with a pin 48 passing through an aperture 50 in the support bracket 24 and affixed to the member 52 of the base structure 16.

The control valve 28 could be a heavy duty valve for controlling the actual functions associated with control 12 such as the boom of a backhoe as well as the dipper and bucket, but it is particularly advantageous to isolate the heavy duty control valve from the operator controls as in the embodiment illustrated. Thus, the control valve 28 illustrated is a servo valve supplied with fluid via supply and return conduits 54, 56, respectively which fluid is of a substantially lower pressure and flow than would be required for the heavy duty control valve. The fluid is supplied from a suitable power source not illustrated and dispersed by conduit means from the various ports 58 illustrated on the servo valve to corresponding valve actuators on the heavy control valve (not illustrated).

By mounting the heavier control valve remote from the control 12, the higher noise level of the heavier control valve is isolated from the operator of the controls. Further, the use of the lower pressure fluid on the servo valve substantially reduces the force requirement for the hand grip 18 on the control 12.

FIG. 3 illustrates the hand grip 18 and its connection to the control valve 28 in greater detail. Column 22 is seen to be hollow and houses a rod assembly 60. On top of the column a recess 62 is provided for receiving the spacers 64 attached to movable spools 66. The movable spools 66 in turn are connected by ball joints 68 in slots 70 of the base plate 72 of hand grip 18. The base plate 72 of hand grip 18 is supported on a stationary spool 74 having a ball joint 76 in the slot 78 within the base plate 72 which permits the base plate 72 to freely pivot about the ball joint 76.

The fixed spool 74 is mounted rigidly with respect to recess 62 on column 22 thereby enabling the movable spools 66 to actuate the rod assembly 60 upon tilting of the base plate 72. The rod assembly consists of rods 80 connected to the movable spools by plates 82 and to the valve spools 84 for control valve 28 by plates 86 and adjusters 88.

The enclosure of the base plate of the hand grip 18 as well as the rod assembly is completed by the bellows type covering 90 made of a suitable flexible material.

In FIG. 4 the geometric relationship between the stationary spool 74 and movable spools 66 is illustrated together with a portion of the base plate 72. The movable spools 66 are located on lines passing through the stationary spool 74 and spaced 90° from each other. Thus, by moving the hand grip 18 through motions at 90° to each other either movable spool 66 may be moved independently of the other spool. On the other hand, should the hand grip 18 be moved to a position intermediate the 90 degree opposed positions then the slots 70 in the base plate 72 of hand grip 18 will permit the ball joints 68 (FIG. 3) to slide within the slots 70 thereby allowing both movable spools 66 to move at the same time. Thus, it can be seen that the two spools by virtue of fore and aft movement can provide independent movement to position control valve spools 84 either independently or simultaneously. When simultaneous motion is provided to the control valve spools 84, then four outputs are available with two being available simultaneously.

In the plan view of FIG. 4 it can be seen that the valve 28 has been rotated 45° from the pivot axis of the support bracket 24 to thereby align the valve 28 so that movement of the grip 18 fore and aft causes movement about an axis passing through stationary spool 74 and one of the movable spools 66 whereby the other movable spool 66 is then moved without any movement of the spool 66 which is on the pivot axis. A complimentary action occurs when the grip 18 is moved side to side and the pivot axis passes through the other movable spool 66 to impart movement only to the first movable spool 66. Thus, by 45° rotation of the valve 28, the fore and aft and side to side movement that is familiar to operators is achieved.

Figure 5:
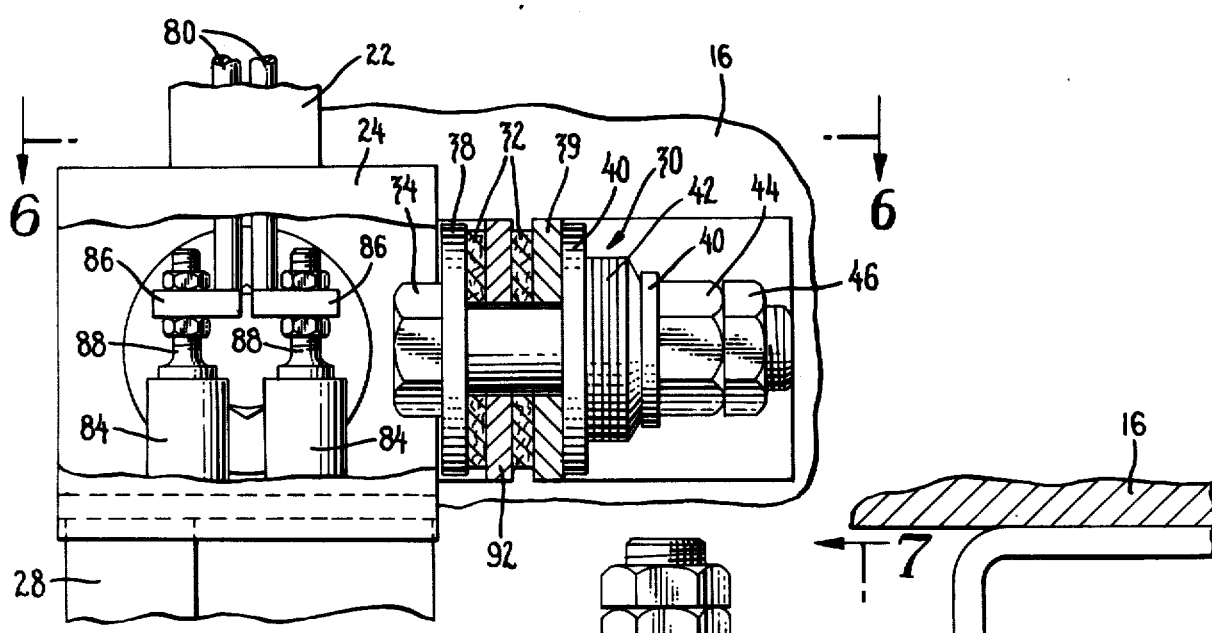
FIG. 5 is an elevational view of another embodiment of the controls illustrated in FIG. 3.
Figure 6:
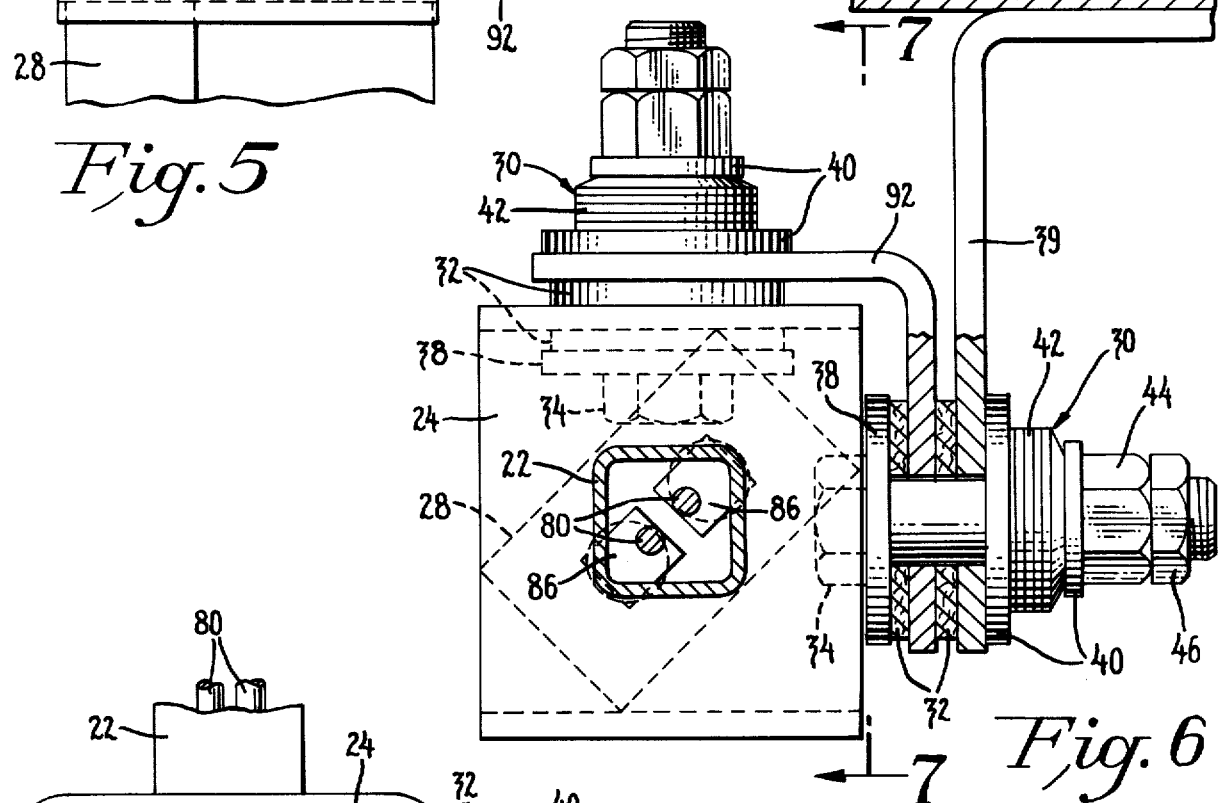
FIG. 6 is a top view taken along line 6—6 of FIG. 5.
Figure 7:
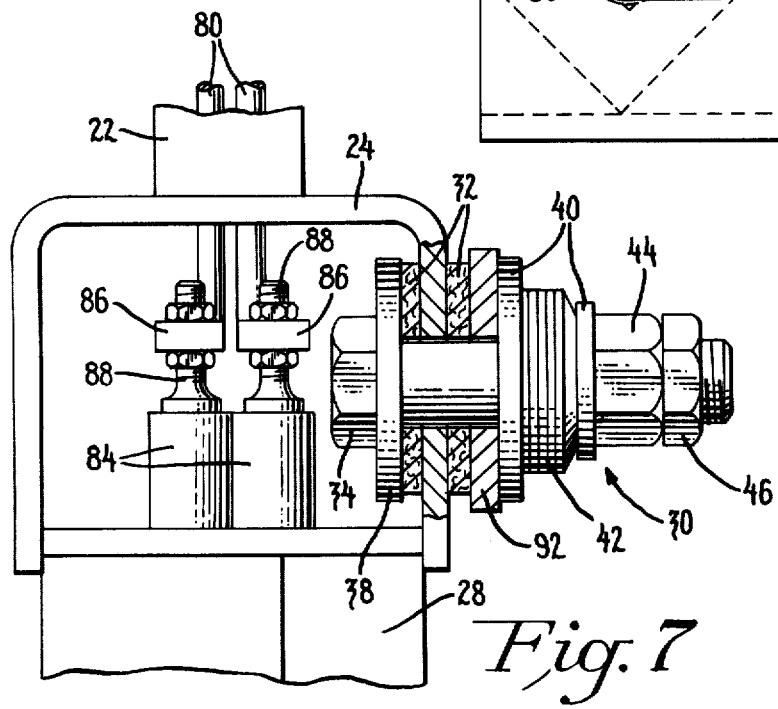
FIG. 7 is an elevational view taken along line 7—7 of FIG. 6.

FIGS. 5–7 illustrate an alternate embodiment of the previously illustrated controls wherein two clutch type assemblies 30 are used to permit the lever 12 to move transverse to the direction indicated by phantom positions A and B of FIG. 2 or to any intermediate position to permit the grip end of the lever 12 to move in a circular pattern. Thus, an individual operating the controls could move them toward or away from his body.

The second clutch type assembly 30 is incorporated by the addition of a support element in the shape of an L-member 92 between element 39 of the base structure 16 and the support bracket 24. The first assembly 30 is the connection between the support bracket 24 and L-member 92, and the second assembly 30 is the connection between L-member 92 and element 39.

In accordance with the provisions of the patent statutes the principle and mode of operation of the control have been explained and what is considered to represent its best embodiment has been illustrated and described. It should, however, be understood that the invention may be practiced otherwise than as specifically illustrated and described without departing from its spirit or scope.

I claim:

1. A control for a fluid control system providing power to controlled components comprising, a lever, a pivotal connection for mounting said lever on and pivoting said lever with respect to said system in at least one direction, a control valve mounted on one end of said lever, said control valve movable with said one end, means for actuating said control valve mounted on the opposite end of said lever from said control valve, and conduit means interconnecting said control valve with the controlled components to permit operation of the controlled components by said means for actuating in a range of positions through which said lever pivots.

2. The control defined in claim 1 wherein said actuating means includes a manual hand operated grip.

3. The control defined in claim 1 wherein said control valve is a hydraulic valve.

4. The control defined in claim 1 wherein said control valve is located on the opposite side of said pivotal connection of said lever from said actuating means.

5. The control defined in claim 1 including a linkage operatively connected between said actuating means and said control valve.

6. The control defined in claim 1 wherein said control valve is a servo valve.

7. The control defined in claim 1 including means for retaining the position of said lever.

8. The control defined in claim 7 wherein said retaining means includes friction engaging means for positioning said lever in a multiple number of positions.

9. The control defined in claim 8 wherein said friction engaging means includes two friction clutch type assemblies to permit said opposite end of said lever to move in a circular pattern.

10. In a vehicle having a fluid control system for providing power to control components on the vehicle, a lever, a pivot member on said lever mounted on and pivoted with respect to said vehicle, a servo valve mounted on said lever adjacent said pivot member, a hand grip control mounted on said lever on the opposite side of said pivot member from said servo valve in a manner such that the distance from said pivot member to said hand grip is greater than the distance from said pivot member to said servo valve, a linkage interconnecting said hand grip with said servo valve, conduit means interconnecting said control valve with the control components, and at least one friction clutch type assembly mounted on said pivot member for retaining multiple positions of said lever while permitting operation of the control components by said hand grip.

* * * * *